United States Patent [19]
Allen et al.

[11] 3,725,613
[45] Apr. 3, 1973

[54] APPARATUS FOR PROTECTING AND TESTING TELEPHONE NETWORK

[75] Inventors: Richard W. Allen, Rairport; Donald G. Maring, Sr.; Henry J. Andrews, Jr., both of Rochester, all of N.Y.

[73] Assignee: The Rochester Telephone Corporation, Rochester, N.Y.

[22] Filed: Feb. 25, 1971

[21] Appl. No.: 118,632

[52] U.S. Cl. ....................179/175.3
[51] Int. Cl. ....................H04b 3/46
[58] Field of Search ..179/2 A, 175.3, 175.31 R, 175; 340/172; 317/16, 31

[56] References Cited

UNITED STATES PATENTS

| | | | |
|---|---|---|---|
| 3,636,280 | 1/1972 | Wetzel | 179/175.3 |
| 3,150,237 | 9/1964 | Baldik et al. | 179/81 R |
| 3,368,110 | 2/1968 | Taylor | 317/31 |
| 3,423,636 | 1/1969 | Rowley | 317/16 |
| 1,145,632 | 7/1915 | Ude | 179/81 R |
| 3,134,054 | 5/1964 | Cronier et al. | 340/172 |
| 1,890,561 | 12/1932 | Cash | 179/175.3 |
| 2,896,128 | 7/1959 | Fuller et al. | 317/16 |
| 1,914,428 | 6/1933 | Hillebrand | 317/16 |

*Primary Examiner*—Kathleen H. Claffy
*Assistant Examiner*—Douglas W. Olms
*Attorney*—Shlesinger, Fitzsimmons & Shlesinger

[57] ABSTRACT

One of the two lines (e.g. tip and ring) linking a telephone company network with a network owned and serviced by a customer of the telephone company is connected through a Zener diode with a relay, which controls two normally-closed switches disposed in the two linking lines. During normal operations the signals in the associated linking line are not great enough to trigger the diode, which maintains the relay deenergized. If a fault develops in one of the networks, an operator at a remote central station of the phone company momentarily applies a high voltage through the associated linking line to the diode, which conducts and momentarily energizes the relay to open its switches and isolate the networks from one another. An RC circuit in parallel with the relay holds it energized for a short time after the triggering signal disappears to enable the operator to test the phone network for faults. Also the two linking lines are provided with current, voltage and power overload devices to prevent customer-owned equipment from damaging the company's network.

4 Claims, 2 Drawing Figures

Figure 1:
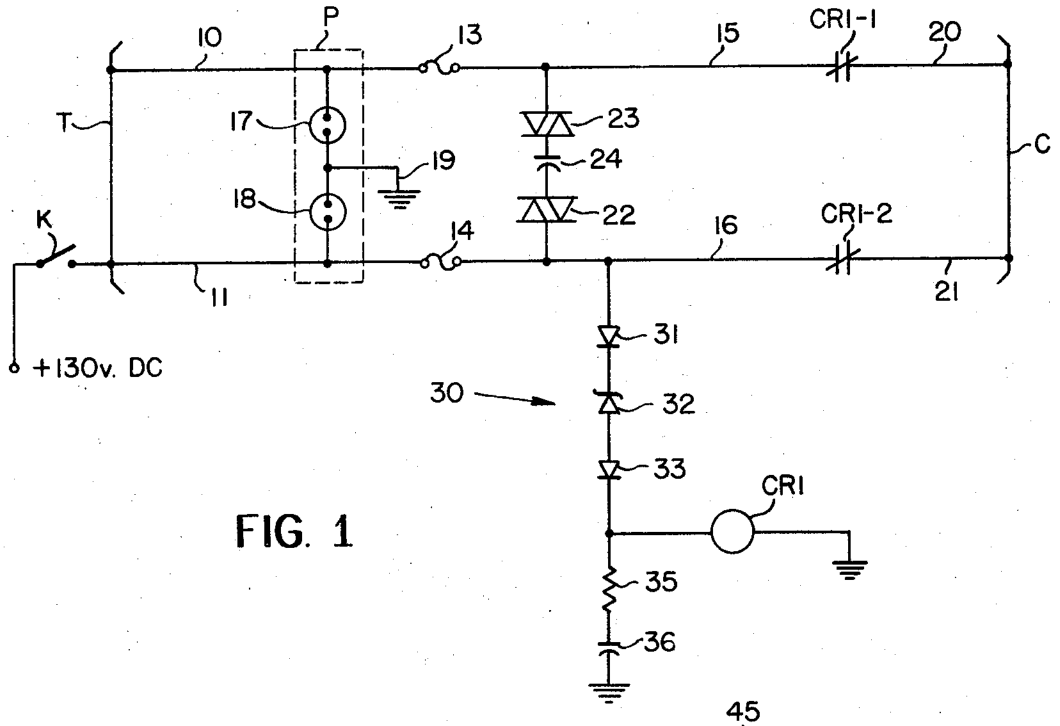

INVENTORS
RICHARD W. ALLEN
DONALD G. MARING, SR.
HENRY J. ANDREWS, JR.
BY
Schlesinger, Fitzsimmons & Schlesinger
ATTORNEYS

APPARATUS FOR PROTECTING AND TESTING TELEPHONE NETWORK

This invention relates to telephone networks, and more particularly to apparatus for locating faults or line failures as between two such networks. More particularly, this invention relates to apparatus linking a telephone company network with a network of customer-owned equipment, and responsive to a signal generated remote from the customer-owned equipment momentarily to disconnect networks from each other.

Because of escalating service costs, for example, certain of the larger customers of telephone companies have begun more and more to buy and service their own equipment. This customer-owned equipment, including telephones and power supplies therefor, is connected directly to the larger network that is owned by the particular telephone company servicing that customer area. HOwever, the cost of repairing and servicing such customer-owned equipment is borne by the customer; and any cost encountered in repairing or servicing the larger, telephone-company-owned network, is absorbed by the telephone company.

The process of locating a failure in one or the other of the two networks (the company-owned and the customer-owned, respectively), and then assigning the repair cost to one or the other of the owners, has heretofore been costly and time-consuming. For example, if the telephone company is servicing both networks, it must inspect both its equipment, and that of the customer to locate the failure, and then either assume the repair cost, if the failure is in its own network, or charge the customer for the repair, if the failure is in the customer-owned network. If the customer services its own equipment, then the time spent searching for the network failure is often duplicated unnecessarily.

A further problem encountered in systems in which customer-owned equipment is linked to a telephone company-owned network, is that random surges or failures in the power supplies of the customer-owned equipment can often have a harmful effect on the equipment owned by the telephone company; and vice versa.

It is an object of this invention to provide novel interface apparatus for linking customer-owned telephone equipment to the larger network of a telephone company, or the like.

Another object of this invention is to provide for telephone networks of the type described, novel linking apparatus, which is capable of both protecting one network from the other, and of selectively isolating one network from the other for the purpose of locating a failure in one of these networks.

Still another object of this invention is to provide apparatus of the type described which has signal-responsive means for momentarily disconnecting linked telephone networks one from the other for the purpose of testing one of the networks for a line failure, or the like.

A more specific object of this invention is to provide a novel, protective interface circuit for connecting customer-owned telephone equipment to telephone company lines, and including means responsive to a signal developed from a remote point in one of the company lines to isolate the customer-owned equipment from the company lines for test purposes.

Other objects of the invention will be apparent hereinafter from the specification and from the recital of the appended claims, particularly when read in conjunction with the accompanying drawing.

Figure 2:
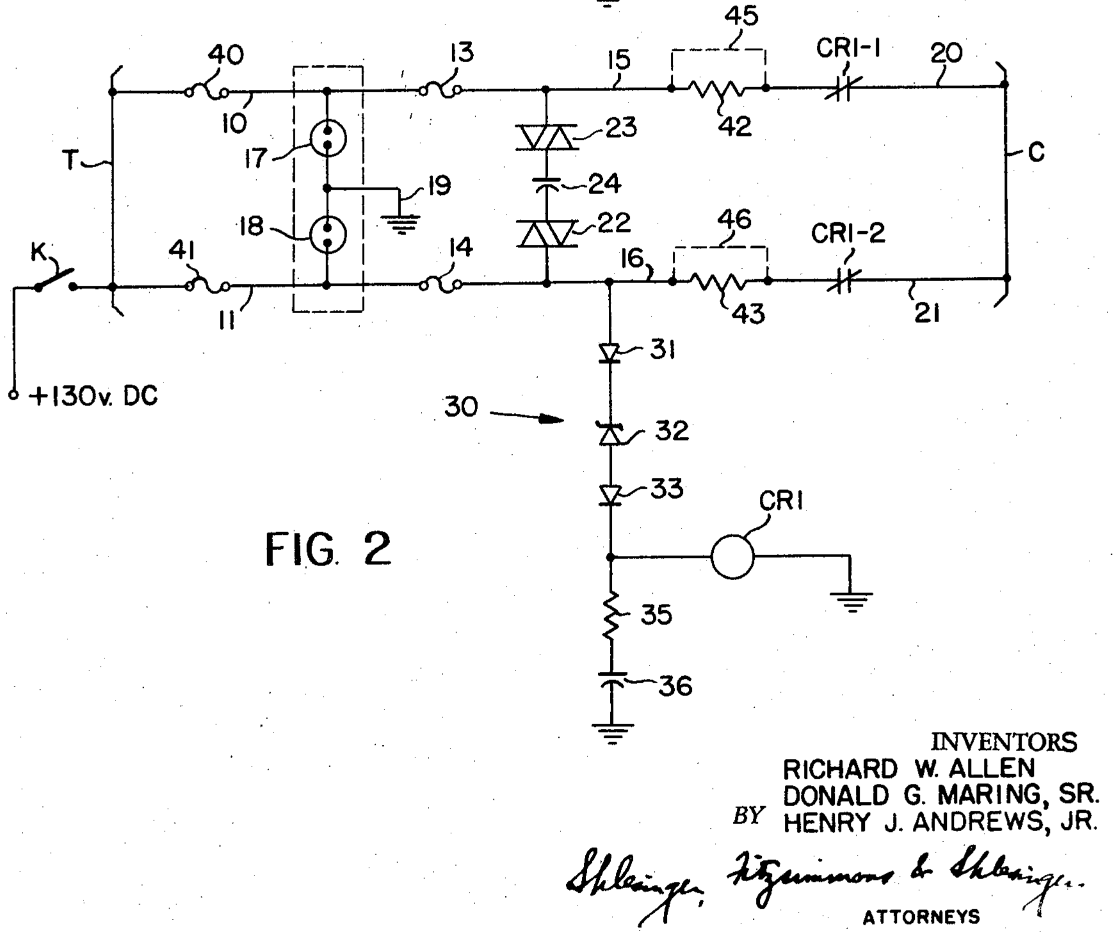

In the drawing:

FIG. 1 is a wiring diagram illustrating a circuit which shows one manner in which apparatus made in accordance with this invention may be wired to perform its desired functions; and FIG. 2 is a wiring diagram illustrating a modification of the circuit shown in FIG. 1.

Referring now to the drawing by numerals of reference, and first to FIG. 1, lines 10 and 11 represent, for example, telephone company ring and tip lines, respectively, which are connected in a conventional manner through a network T of telephone company lines to one of its central offices. Lines 20 and 21 represent, for example, a customer's ring and tip lines, respectively, which are also connected in a conventional manner through the customer-owned and operated network C of lines to its various phones. For any telephone calls entering or leaving the customer network C, as distinguished from calls placed within the customer network, obviously the ring lines 10, 20 and tip lines 11, 21 must be linked to transmit signals between the networks.

In the embodiment illustrated in FIG. 1, line 10 is connected through a fuse 13, a line 15, and a set of normally-closed relay contacts CR1–1 with the line 20. Line 11 is connected through a fuse 14, a line 16, and a set of normally-closed relay contacts CR1–2 with line 21.

Connected between lines 10 and 11 is a voltage level protector P, comprising a pair of gas discharge tubes 17 and 18, each of which is connected at one side to one of the lines 10 and 11, respectively, and at its opposite sides through a line 19 to ground. Tubes 17 and 18 are designed to fire or conduct whenever the voltage applied either to line 10 or 11, respectively, exceeds a predetermined value, for example, approximately 230 volts to ground. Whenever one of these tubes 17 or 18 conducts, it operates to hold the associated line 10 or 11 at approximately 120 volts maximum.

Connected between lines 15 and 16 is a power level control device comprising a pair of varistors 23 and 22, which at one end are connected to lines 15 and 16, respectively, and at their opposite ends to opposite sides of the capacitor 24. The varistors 23, 22 and capacitor 24 operate to hold the alternating current power level in the circuit to a maximum of about 3 dBm.

Connected to line 16 between the fuse 14 and the normally-closed switch contacts CR1–2 is a signal-responsive, line-testing circuit denoted generally at 30. This circuit comprises a diode 31, which has its anode connected to the line 16 and its cathode connected to the cathode of a Zener diode 32. The anode of diode 32 is connected to the anode of a further diode 33, the cathode of which is connected through the operating coil of a relay CR1 to ground, and also through a resistor 35 and a capacitor 36 to ground. The relay CR1 controls the switch contacts CR1–1 and CR1–2, so that when the relay CR1 is energized, contacts CR1–1 and CR1–2 are opened to disconnect lines 20 and 21 from lines 15 and 16, respectively, and hence from the telephone company lines 10 and 11, respectively.

The circuit illustrated in FIG. 1 is designed primarily for use in unexposed or sheltered areas, which are not likely to be subjected to lightning strikes, or the like. Under these circumstances, the fuses 13 and 14 may be selected to limit the current in lines 10 and 11 to, for example, approximately one-half amp maximum. Also, the Zener diode 32 is set to be triggered or conduct only when subjected to a reverse bias voltage of about 75 volts or more. Under normal circumstances, therefore, assuming that there is no fault either in the customer-owned network C, nor in the telephone company-owned network T, the dial pulses developed in the linked networks do not exceed the threshold voltage of the Zener diode 32; and consequently the circuit 30 is in a non-conducting state, and the relay CR1 remains deenergized.

If, however, a fault, such as a grounded line, or the like, develops in the network C or T, thus interrupting proper service to the customer network C, then an operator at a central office of the telephone company may initiate a line test merely by momentarily applying a positive test-initiating signal of approximately 130 volts to line 11, and hence through fuse 14 to the anode of the diode 31. In practice, this test-initiating or triggering signal can be applied, for example, by operating a conventional coin collect key K, or the like, which is located at the central office and connected to line 11. Preferably this triggering signal is applied for about five seconds, and then removed from line 11.

During the interval of time that a positive 130 volt triggering signal is applied to the anode of the diode 31, this diode is biased forwardly and conducts, and therefore applies the triggering signal to the Zener diode 32. Since this signal exceeds 75 volts, diode 32 conducts and biases diode 33 forwardly so that it conducts, whereby approximately 75 volts of this signal is dropped across diode 32, and the remaining portion, approximately 50 volts or so, is applied both to the operating coil of relay CR1, and across resistor 35 and the capacitor 36 to ground. Relay CR1 is thus instantly energized, and opens its contacts CR1–1 and CR1–2 to isolate lines 15 and 16 from the customer-owned lines 20 and 21 and the associated network C.

During the 5 second interval that the diodes 31, 32 and 33 are conducting, the capacitor 36 becomes fully charged. Thereafter, when the switch or key K is opened so that the 130 volt triggering signal disappears, and the diodes 31, 32 and 33 cease to conduct, the capacitor 36 discharges through the operating coil of the relay CR1, thereby maintaining this relay energized for approximately an additional three seconds. During the discharge of the capacitor 36, the diode 33 is reverse biased, so that it is disposed in a blocking or non-conductive state.

During the three second or so interval that the capacitor 36 is discharging, the relay contacts CR1–1 and CR1–2 remain open, so that the operator at the central office may during this period conduct tests in a conventional manner on the lines of the telephone company-owned network T to determine whether or not the fault exists in any of the lines of this network; and thus, by the process of elimination, may determine whether or not the fault lies in the customer-owned network C. In other works, if the line tests initiated by the central office fail to turn up any faults or undesirable grounds in the lines of the network T, then the telephone company will know that the fault exists in the customer-owned network C, and may so inform the customer, which may then, if it so desires, dispatch its own repair crew to detect and repair the fault in its equipment. The telephone company may then bill the customer a specified fee for having conducted the test. On the other hand, if during the period that the two networks are isolated one from the other the tests indicate that the fault lies somewhere in the network T, then the telephone company will know that the fault lies in its equipment, and not in that of the customer-owned equipment, and may initiate the necessary steps to have the fault repaired.

In the modified circuit of FIG. 2, wherein like numerals are employed to denote elements similar to those employed in the embodiment of FIG. 1, two additional fuses 40 and 41 are inserted in lines 10 and 11, respectively, between the telephone company network T and the protective device P. This modified circuit is particularly adapted for use in unprotected or exposed areas, where the circuit may possibly be subjected to undesirable high voltage and current situations, as for example, in the case where lightning accidentally strikes the circuit. Fuses 40 and 41 are selected to limit the current flowing in each of the lines 10 and 11 to approximately 8 amps maximum. Then if the circuit should happen to be subjected suddenly to a high voltage or current load, the gas tube protector P will conduct, and the resulting current flow in lines 10 and 11 will cause one or the other, or both, of the fuses 40 and 41 to blow, thereby protecting the lines in the telephone network T.

Also in this modified circuit resistors 42 and 43 are connected in lines 15 and 16, respectively, between the power overload protector represented by the varistors 23 and 22, and the normally-closed relay contacts CR1–1 and CR1–2. These resistors, each of which may be of approximately one hundred ohms, assist the associated varistors in reducing the power level in the circuit to the acceptable 3 dBm level. However, in those cases where less power limiting is desired in the linking circuit, the resistors 42 and 43 may be shunted out of the circuit by connecting line 15 directly through a line 45 (broken lines in FIG. 2) to one side of the switch contacts CR1–1, and by connecting line 16 directly through a line 46 (broken lines in FIG. 2) directly to one side of switch contact CR1–2. In practice, the circuit may be manufactured with the line 45 and 46 connected in shunt across the associated resistors 42 and 43, respectively; and then, if it is desired to limit the power level of the circuit the conductors or lines 45 and 46 may be severed at the time that the circuit is installed, thereby operatively incorporating the resistors 42 and 43 in the circuit.

The circuit of FIG. 2 is otherwise similar in construction and operation to the circuit of FIG. 1.

From the foregoing it will be apparent that the instant invention provides relatively simple and inexpensive means both for protecting telephone company-owned networks from privately-owned equipment interfaced therewith, and also for permitting rapid and selective isolation of the privately-owned equipment from the telephone company network in order to enable the telephone company to conduct fault-detecting tests solely on its own equipment. MOreover, the current, voltage and power overload devices incorporated in the novel circuits disclosed herein enable a telephone company, for example, to prevent costly breakdowns in its equipment that might otherwise result from improper maintenance or operation of the power sources associated with privately-owned equipment with which the telephone company equipment is linked.

In addition, where interface or linking equipment of the type disclosed herein is employed, the signal-responsive circuit 30 is located remote from the central office in which line tests are conducted, so that merely by transmitting a positive triggering signal of 130 volts (plus or minus 5 volts), the particular customer equipment associated with that circuit 30 will automatically be isolated momentarily from the associated telephone network so that the telephone company can conduct tests for line faults in its equipment. This substantially minimizes the time and effort involved in locating and assigning the responsibility for the repair of faults in linked equipment of the type described.

While the illustrated embodiments each disclose means for linking the equipment of a single customer to the telephone company-owned network, it will be appreciated that similar linking circuits can be employed to link the telephone company network to numerous other privately-owned networks, so that the equipment owned by each such customer can be monitored from one or more of the central offices of the telephone company. Moreover, while the embodiment of FIG. 2 illustrates the use of resistors 42 and 43 to assist in limiting the A.C. power level of this linking circuit, it will be appreciated that, if desired, the resistors 42 and 43, and the associated shunts 45 and 46, respectively, could be incorporated in the corresponding lines 15 and 16 of the embodiment illustrated in FIG. 1. Similarly, if desired, the fuses 13 and 14 could be inserted in lines 20 and 21 rather than in lines 10 and 11, without departing from the scope of this invention. Also, the diode 33 could be eliminated, in which case the diode 31 would block current flow between line 16 and circuit 30 during the discharge of capacitor 36.

Having thus described our invention, what we claim is:

1. Apparatus for linking together a pair of telephone networks, each having a pair of linking lines for interconnecting said networks to transmit signals therebetween, and one of said networks having testing means for selectively and momentarily applying to one of its linking lines a triggering signal having a potential greater than the maximum potential of the first-named signals to initiate a test for faults in said one network, comprising switch means normally connecting said pairs of lines together to enable the transmission of said first-named signals between said networks, means connected between the two linking lines of said one network to limit the AC power in said linking lines, when the two pairs thereof are connected, a circuit including a solid state element connected to said one linking line normally to be in a non-conductive state during the transmission of said first-named signals between said networks, and operative to be switched to a conducting state upon application of said triggering signal to said one linking line, switch operating means connected to said element to be energized, when said element is in its conducting state, and operative, when energized, to cause said switch means to disconnect said pairs of lines electrically from each other without adding any additional circuitry to said one network, and delay means connected to said element and said switch operating means and operative to maintain said switch operating means energized for a predetermined period of time necessary to conduct said test for faults in said one network, after said triggering signal is removed from said one line, said switch means being interposed between said power limiting means and the other of said networks, whereby said power limiting means remains connected across said lines of said one network during the test thereof.

2. Apparatus as defined in claim 1, wherein said switch means comprises a pair of normally-closed switches electrically connecting the two linking lines of said one network to the two linking lines of the other network, said switch operating means comprises a relay having an operating coil interposed between said element and ground, and operative, when energized, to open said switches, and said element comprises a Zener diode connected between said one line and said coil normally to block current flow from said one line to said coil, and responsive to said triggering signal to conduct an permit energization of said coil by said triggering signal.

3. Apparatus as defined in claim 2, wherein said delay means comprises a resistor and capacitor circuit connected in parallel with said coil, and a blocking diode interposed between said one line and the last-named circuit to cause said capacitor to discharge through said coil, when said triggering signal is removed from said one line.

4. Apparatus as defined in claim 3, wherein a gas discharge tube is connected to each of said lines of one of said pairs thereof to limit the maximum voltage attainable on the lines of said one pair, said power limiting means comprises a pair of varistors, each connected at one side to one of the lines of said one pair and at its opposite side to a further capacitor to limit the alternating current power level in said lines, and a fuse is disposed in each of the lines of said one pair to limit the maximum current flow therein.

* * * * *